US008420001B2

(12) United States Patent
Leuterer et al.

(10) Patent No.: US 8,420,001 B2
(45) Date of Patent: Apr. 16, 2013

(54) INFLUENCING SPECIFIC MECHANICAL PROPERTIES OF THREE-DIMENSIONAL OBJECTS MANUFACTURED BY A SELECTIVE SINTERING BY MEANS OF ELECTROMAGNETIC RADIATION FROM A POWDER COMPRISING AT LEAST ONE POLYMER OR COPOLYMER

(75) Inventors: Martin Leuterer, Olching (DE); Andreas Pfister, Munich (DE); Frank Mueller, Fuerstenfeldbruck (DE); Alan Wood, Cumbria (GB); Brian Wilson, Lancashire (GB); Horst Sandner, Waldems (GB)

(73) Assignee: EOS GmbH Electro Optical Systems, Krailling (DE)

( * ) Notice: Subject to any disclaimer, the term of this patent is extended or adjusted under 35 U.S.C. 154(b) by 198 days.

(21) Appl. No.: 12/454,473

(22) Filed: May 18, 2009

(65) Prior Publication Data
US 2009/0312454 A1    Dec. 17, 2009

Related U.S. Application Data

(60) Provisional application No. 61/188,958, filed on Aug. 14, 2008.

(30) Foreign Application Priority Data

May 20, 2008    (EP) .................... 08009274

(51) Int. Cl.
B29C 35/08    (2006.01)
C08F 2/42    (2006.01)
C08J 3/28    (2006.01)

(52) U.S. Cl.
USPC ............ 264/497; 264/413; 264/425; 522/163

(58) Field of Classification Search .................. 264/497, 264/413, 425; 522/163
See application file for complete search history.

(56) References Cited

U.S. PATENT DOCUMENTS

| | | | |
|---|---|---|---|
| 6,110,411 A * | 8/2000 | Clausen et al. ................ | 264/497 |
| 6,136,948 A | 10/2000 | Dickens, Jr. et al. | |
| 6,245,281 B1 * | 6/2001 | Scholten et al. ............... | 264/497 |
| 6,932,935 B1 * | 8/2005 | Oberhofer et al. ............ | 264/497 |
| 7,569,174 B2 * | 8/2009 | Ruatta et al. ................... | 264/497 |
| 7,575,708 B2 * | 8/2009 | DeGrange et al. ............ | 264/497 |
| 2004/0102539 A1 | 5/2004 | Monsheimer et al. | |
| 2004/0180980 A1 | 9/2004 | Petter et al. | |
| 2006/0134419 A1 | 6/2006 | Monsheimer et al. | |
| 2006/0251878 A1 | 11/2006 | Meakin et al. | |
| 2007/0131609 A1 * | 6/2007 | Ramaswamy et al. ........ | 210/490 |
| 2007/0196561 A1 | 8/2007 | Philippi et al. | |
| 2007/0197692 A1 | 8/2007 | Monsheimer et al. | |
| 2007/0232753 A1 * | 10/2007 | Monsheimer et al. ........ | 525/153 |
| 2007/0267766 A1 | 11/2007 | Hesse et al. | |
| 2008/0247687 A1 | 10/2008 | Stecher | |
| 2009/0295042 A1 | 12/2009 | Pfister et al. | |

FOREIGN PATENT DOCUMENTS

| | | |
|---|---|---|
| AU | 2003255225 | 5/2004 |
| DE | 44 10 046 | 5/1995 |
| EP | 1 707 341 | 10/2006 |
| EP | 1 674 497 | 8/2008 |
| JP | 61037419 | 2/1986 |
| JP | 02-250206 | 10/1990 |
| JP | 4-502635 | 5/1992 |
| JP | 2004-137465 | 5/2004 |
| JP | 2006-312310 | 11/2006 |
| JP | 2007-039631 | 2/2007 |
| JP | 2007-535585 | 12/2007 |
| JP | 2010-006057 | 1/2010 |
| RU | 2 069 154 | 10/1988 |
| RU | 2 048 272 | 11/1995 |
| RU | 2 080 963 | 6/1997 |
| WO | WO-89/03301 | 4/1989 |
| WO | WO-90/06957 | 6/1990 |
| WO | WO-2006/092126 | 9/2006 |

OTHER PUBLICATIONS

DIN 53765 "Testing of plastics and elastomeres, Thermal analysis, DSC-method", Mar. 1994, Beuth Verlag.
Dawson, et al., X-ray data for poly(aryl ether ketones), Polymer, 1980, vol. 21, May, pp. 577-578.
DIN-EN ISO 1183-1, Plastics "Methods for determining the density of non-cellular plastics" Part 1—Immersion method, liquid pyknometer method and titration method; (ISO 1183-1: 2004) German Version; (EN ISO 1183-1: 2004) English Version, Beuth Verlag.
Salmoria at al., "Rapid manufacturing of PA/HDPE blend specimens by selective laster sintering: Microstructural characterization", ScienceDirect, Polymer Testing 26 (2007) 361-368.

* cited by examiner

*Primary Examiner* — Sanza McClendon
(74) *Attorney, Agent, or Firm* — Edwards Wildman Palmer LLP; George W. Neuner

(57) ABSTRACT

A three-dimensional object is manufactured from a powder of polymer material by selective sintering process by means of electromagnetic radiation of the powder, wherein the powder comprises a preselected polymer or copolymer and is subjected to selective sintering such that the manufactured three-dimensional object has a final crystallinity which is in such a range that the balance of properties, in particular mechanical properties including Young's modulus, tensile strength and elongation at break, is improved.

21 Claims, 1 Drawing Sheet

*Prior Art*
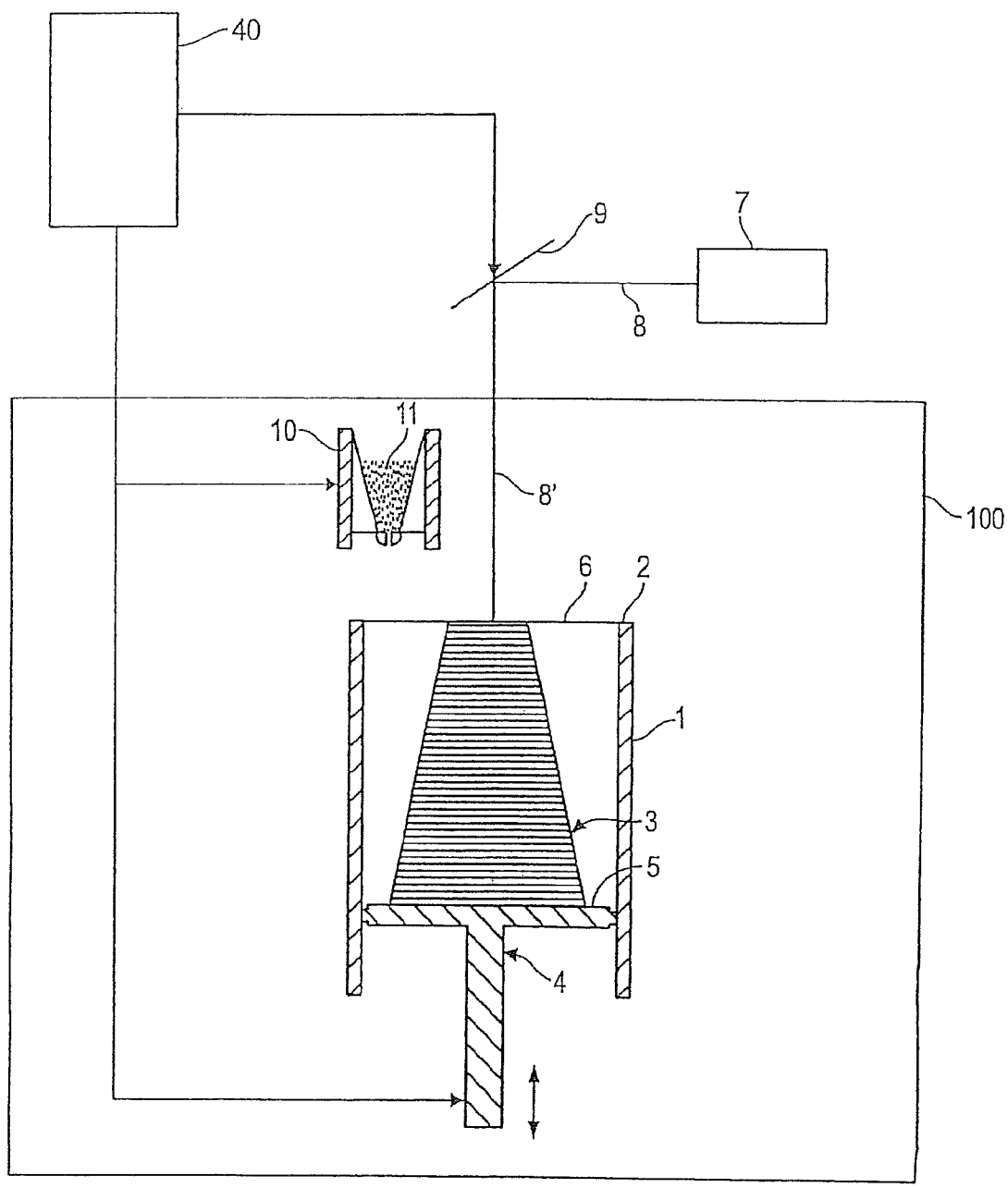

INFLUENCING SPECIFIC MECHANICAL PROPERTIES OF THREE-DIMENSIONAL OBJECTS MANUFACTURED BY A SELECTIVE SINTERING BY MEANS OF ELECTROMAGNETIC RADIATION FROM A POWDER COMPRISING AT LEAST ONE POLYMER OR COPOLYMER

FIELD OF THE INVENTION

The present invention relates to a process for manufacturing a three-dimensional object from a powder by selective sintering by means of electromagnetic radiation of the powder, wherein the powder comprises at least one polymer material and wherein the manufactured three-dimensional object has an advantageously decreased crystallinity compared to conventional selective sintering by means of electromagnetic radiation. Furthermore, the present invention relates to a three-dimensional object obtained by said process, an apparatus for said process and a use of a preselected polymer powder in said process.

DESCRIPTION OF BACKGROUND ART

As known from DE 44 10 046, a process for manufacturing a three-dimensional object by a selective sintering by means of electromagnetic radiation may be carried out layer-wise with a source for electromagnetic radiation. In such a process, three-dimensional objects are manufactured in a layer-wise manner by applying layers of a powder and bonding them to each other by a selective solidification of the powders at positions in the layers corresponding to cross-sections of the objects.

FIG. 1 shows an example of a prior art laser sintering device by means of which a process for a layer-wise manufacturing of a three-dimensional object may be performed. As is apparent from FIG. 1, the device comprises a container 1. This container is open to the top and is limited at the bottom by a support 4 for supporting an object 3 to be formed. By the upper edge 2 of the container (or by its sidewalls) a work plane 6 is defined. The object is located on the top side of the support 4 and is formed from a plurality of layers of a building material in powder form that can be solidified by means of electromagnetic radiation, wherein the layers are in parallel to the top side of the support 4. The support may be moved in a vertical direction, i.e. in parallel to the sidewall of the container 1, via a height adjustment device. Thereby the position of the support 4 relative to the work plane 6 can be adjusted.

Above the container 1, or rather the work plane 6, an application device 10 is provided for applying the powder material 11 to be solidified onto the support surface 5 or a previously solidified layer. Also, an irradiation device in the form of a laser 7, which emits a directed light beam 8, is arranged above the work plane 6. This light beam 8 is directed as deflected beam 8' towards the work plane 6 by a deflection device 9 such as a rotating mirror. A control unit 40 allows to control the support 4, the application device 10 and the deflection device 9. The items 1 to 6, 10 and 11 are located within a machine frame 100.

When the three-dimensional object 3 is manufactured, the powder material 11 is applied layer-wise onto the support 4 or a previously solidified layer and is solidified at the positions of each powder layer that correspond to the object by means of the laser beam 8'. After each selective solidification of a layer the support is lowered by the thickness of the powder layer to be subsequently applied.

BACKGROUND OF THE INVENTION

Many modifications of processes and devices for manufacturing a three-dimensional object by a selective sintering by means of electromagnetic radiation compared to the system described above exist and can be used. For example, instead of using a laser and/or a light beam, other systems to selectively deliver electromagnetic radiation could be used, such as, e.g., mask exposure systems or the like.

However, in previous processes for selective sintering by means of electromagnetic radiation of polymer powders, insufficient attention was paid to mechanical properties of the manufactured objects.

Therefore, the object of the present invention is to provide an improvement of a process for manufacturing a three-dimensional object by selective sintering by means of electromagnetic radiation of polymer powders, which leads to improved mechanical properties of the manufactured objects.

According to the present invention, it has been surprisingly found that when observing that the manufactured three-dimensional objects have a specific range of crystallinity, a marked improvement of certain, very advantageous mechanical properties including, but not limited to high stiffness, high compression strength, high impact strength, high maximal tensile- and bending strength as well as high elongation at break and high heat deflection temperature are obtained, while on the other hand opposing or trade-off properties such as good chemical resistance and low post shrinkage by post crystallisation are well balanced. Furthermore, it has been surprisingly found that particular process conditions, especially regarding the cooling period after sintering, and particular selection criteria concerning preselected polymer materials, respectively alone or in combination, contribute to significant enhancements of the aforementioned mechanical properties and balancing characteristics. Moreover, a markedly improved combination of both controlled crystallinity and low porosity in the manufactured three-dimensional object can be achieved, which provides for a further improvement of the above mentioned properties. The advantages of the invention are particularly feasible when polyaryletherketone polymer or a polyaryletherketone copolymer, or when a polyamide polymer or a polyamide copolymer is appropriately used as a polymer material of the polymer powder. Furthermore, the advantages of the invention are also feasible for composites, wherein the crystallinity value relates to the polymer matrix of the composite. Such composites comprise one or more filler(s) and/or additive(s) besides a matrix of the respective polymer, copolymer or blend.

As a preferred alternative to classical polymer processing technologies involving pressure processing of polymers, like e.g. injection molding, the process according to the present invention can be carried out layer-wise in an additive process, wherein successive layers of the object to be formed from solidifiable powder material are subsequently solidified by the electromagnetic radiation at positions corresponding to the cross-section of the object.

SUMMARY OF THE INVENTION

Various aspects, advantageous features and preferred embodiments of the present invention as summarized in the following items, respectively alone or in combination, contribute to solving the object of the invention:

(1) A process for manufacturing a three-dimensional object from a powder by selective sintering by means of electromagnetic radiation of the powder, wherein the powder comprises a preselected polymer or copolymer and is subjected to selective sintering such that the manufactured three-dimensional object has a final crystallinity which is in such a range that the balance of the overall mechanical properties of Young's modulus, tensile strength and elongation at break is improved.

The Young's modulus of the polymer or copolymer is preferably at least 500 MPa, more preferably at least 1000 MPa and particularly at least 2000 MPa, tensile strength is preferably at least 20 MPa, more preferably at least 30 MPa and particularly at least 40 MPa and elongation at break is preferably at least 1%, more preferably at least 2%, still more preferably at least 5%. and particularly at least 20%.

To provide more specific values, for example, for polyaryletherketone polymer and polyaryletherketone copolymers, the Young's modulus is preferably at least 3000 MPa, more preferably at least 3500 MPa and particularly at least 4000 MPa, tensile strength is preferably at least 50 MPa, more preferably at least 70 MPa and particularly at least 90 MPa and elongation at break is preferably at least 1.5%, more preferably at least 2%, still more preferably at least 3%. and particularly at least 5%, and for polyamide polymer and polyamide copolymers, Young's modulus is preferably at least 1000 MPa, more preferably at least 1500 MPa, still more preferably at least 2500 MPa, tensile strength is preferably at least 35 MPa, more preferably at least 45 MPa and particularly at least 70 MPa and elongation at break is preferably at least 5%, more preferably at least 20%, still more preferably at least 40% and particularly at least 60%.

(2) A process for manufacturing a three-dimensional object from a powder by selective sintering by means of electromagnetic radiation of the powder, alone or in combination with (1) above, wherein the powder comprises a preselected polymer or copolymer and is subjected to selective sintering such that the manufactured three-dimensional object has a final crystallinity of 80% or less, preferably 50% or less, especially 5-70%, more preferably 15-50% and particularly 15-35%.

(3) The process according to (1) or (2), in which process layers of the object to be formed from solidifiable powder material are successively solidified at positions corresponding to the cross-section of the object.

(4) The process according to any one of the preceding items, in which process the electromagnetic radiation is provided by a laser.

(5) The process according to any one of the preceding items, which comprises a predefined and/or controlled cooling step after completion of the sintering step.

(6) The process according to any one of the preceding items, wherein the manufactured three-dimensional object has a porosity of less than 10%, preferably 5%, more preferably 3% and most preferably less than 2%.

(7) The process according to any one of the preceding items, wherein the powder comprising a polymer or a copolymer has a melting point $T_m$ in a range of 100° C. to 450° C., preferably 150° C. to 400° C. and more preferably 250° C. to 400° C.

(8) The process according to any one of the preceding items, wherein the polymer or copolymer has a molecular weight $M_n$ of at least 10,000, preferably 20,000 to 200,000, more preferably 20,000 to 100,000 or Mw of at least 20,000, preferably 30,000 to 500,000, more preferably 30,000-200,000.

(9) The process according to any one of the preceding items, wherein the polymer or copolymer has a polymerisation degree of preferably 10 to 10,000, more preferably 20 to 5,000 and particularly 50 to 1,000.

(10) The process according to any one of the preceding items, wherein the polymer or copolymer comprises at least one aromatic group in the backbone chain, preferably in at least one of the repeating units of the backbone chain.

(11) The process according to item (10), wherein the aromatic groups independently from each other denote unsubstituted or substituted, monocyclic or polycyclic aromatic hydrocarbons.

(12) The process according to item (10) or (11), wherein the aromatic groups are respectively and independently selected from the group consisting of 1,4-phenylene, 4,4'-biphenylene, 4,4'-isopropylidendiphenylene, 4,4'-diphenylsulfone, 1,4-, 1,5- and 2,6-naphthalene, 4,4'-terphenylene and 2,2-di-(4-phenylen)-propane.

(13) The process according to items (10) to (12), wherein the aromatic groups are substituted with one or more side chains.

(14) The process according to items (10) to (13), wherein the side chains are respectively and independently selected from the group of C1 to C6 straight chain or branched chain or cyclic alkyl and alkoxy groups, and aryl groups.

(15) The process according to items (13) or (14), wherein the side chains are respectively and independently selected from methyl, isopropyl, t-butyl or phenyl.

(16) The process according to any of the preceding items, wherein the end groups of the backbone chain of the polymer or copolymer are modified.

(17) The process according to any of the preceding items, wherein a blend of at least two different polymers or copolymers is used.

(18) The process according to (17), wherein one component of the blend reduces the final crystallinity of the manufactured object.

(19) The process according to any of the preceding items, wherein the polymer or copolymer is selected from the group consisting of polyamide (PA), polyaryletherketone (PAEK), polyarylethersulfone (PAES), polyester, polyether, polyolefin, polystyrene, polyphenylenesulfide, polyvinylidenfluoride, polyphenylenoxide, polyimide and copolymers and blends comprising at least one of the aforementioned polymers.

(20) The process according to any of the preceding items, wherein the polymer or copolymer is selected from the group consisting of polyamide, polyaryletherketone, and copolymers and blends comprising at least one of the aforementioned polymers.

(21) The process according to any of the preceding items, wherein the polymer or copolymer is a polyaryletherketone (PAEK) selected from the group consisting of polyetheretherketone (PEEK), polyetherketoneketone (PEKK), polyetherketone (PEK), polyetheretherketoneketone (PEEKK) and polyetherketoneetherketoneketone (PEKEKK) and Polyetheretheretherketone (PEEEK) and copolymers and blends comprising at least one of the aforementioned polymers.

(22) The process according to any of the preceding items, wherein the polymer or copolymer is a polyaryletherketone (PAEK) selected from the group of PEEK, PEK, PEKEKK, and copolymers and blends comprising at least one of the aforementioned polymers.

(23) The process according to any of the preceding items, wherein the copolymer is a polyaryletherketone (PAEK)/polyarylethersulfone(PAES)-copolymer.

(24) The process according to (23), wherein the ratio between the amount of sulfone groups to the amount of keto groups in the PAEK/PAES-copolymer is in a range of 50:50 to 10:90.

(25) The process according to (23) or (24), wherein the polyaryletherketone(PAEK)/polyarylethersulfone(PAES)-copolymer is selected from the group consisting of polyaryletherketone(PAEK)/polyarylethersulfon(PAES)-diblock-copolymers or PAEK/PAES/PAEK-triblock-copolymers, preferably from the group consisting of (PEK)/(PES)-diblock-copolymers and PEK/PES/PEK-triblock-copolymers.

(26) The process according to any one of (19) to (25), wherein the polyaryletherketone (PAEK) polymer or copolymer has a molecular weight Mn of at least 9,000, preferably 10,000 to 100,000, more preferably 15,000 to 50,000 and most preferably 20,000 to 35,000 or Mw of 20,000 to 500,000 preferably 40,000 to 200,000 and more preferably 50,000 to 125,000.

(27) The process according to any one of (20) to (26), wherein the polyaryletherketone (PAEK) polymer or copolymer has a melt viscosity in a range of 0.05-1.0 $kN*s/m^2$, preferably 0.15-0.6 $kN*s/m^2$, and particularly 0.2-0.45 $kN*s/m^2$.

(28) The process according to (19), wherein the polyaryletherketone (PAEK) polymer or copolymer has a polymerisation degree n of preferably 10 to 1,000, more preferably 20 to 500 and particularly 40 to 250.

(29) The process according to any one of (19) to (28), wherein the polymer or copolymer is polyaryletherketone (PAEK) and wherein the manufactured three-dimensional object has a final crystallinity of 5 to 45%, preferably 10 to 40%, more preferably 15 to 35%, even more preferably 15 to 30% and most preferably 20 to 25%.

(30) The process according to any one of (19) to (29), wherein the polymer or copolymer is polyaryletherketone (PAEK) and wherein the manufactured three-dimensional object has a density of at least 1.24 $g/cm^3$, more preferably 1.26 $g/cm^3$, even more preferably 1.28 $g/cm^3$ and most preferably >1.30 $g/cm^3$.

(31) The process according to (19), wherein the polymer or copolymer is polyamide (PA) and wherein the manufactured three-dimensional object has a final crystallinity of 10 to 50%, more preferably 15 to 40%, even more preferably 15 to 35% and most preferably 20 to 30%.

(32) The process according to (31), wherein the polyamide (PA) polymer or copolymer has at least one repeating unit of the backbone chain wherein the length of at least one aliphatic chain is in the range of preferably C4 to C18, more preferably C6 to C12 and particularly C10 to C12.

(33) The process according to (32), wherein the polymer or copolymer is polyamide (PA) and wherein the manufactured three-dimensional object has a density of at least 0.90 $g/cm^3$, more preferably 0.95 $g/cm^3$ and particularly 1.00 $g/cm^3$.

(34) The process according to any one of the preceding items, comprising a step of cooling the object from a temperature which is 1-50° C., more preferably 1-30° C., even more preferably 1-20° C. and most preferably 1-10° C. lower than $T_m$ of the polymer or copolymer comprised by the powder down to $T_g$ of the polymer or copolymer comprised by the powder at a cooling rate of 0.01-10° C./min, preferably 0.1-5° C./min, more preferably 1-5° C./min, after completion of the object, wherein $T_m$ is the melting temperature and $T_g$ is the glass transition temperature of the polymer or copolymer comprised by the powder, respectively.

(35) A process for manufacturing a three-dimensional object from a powder by a step of selective sintering by means of electromagnetic radiation of the powder, wherein the powder comprises at least one polymer or copolymer material, wherein the process comprises a predefined and/or controlled cooling step after completion of the sintering step.

(36) The process according to (34) or (35), wherein the cooling step is predefined and/or controlled such that the manufactured three-dimensional object has a final crystallinity which is in such a range that the balance of the overall mechanical properties of Young's modulus, tensile strength and elongation at break is improved. The Young's modulus of the polymer or copolymer is preferably at least 500 MPa, more preferably at least 1000 MPa and particularly at least 2000 MPa, tensile strength is preferably at least 20 MPa, more preferably at least 30 MPa and particularly at least 40 MPa and elongation at break is preferably at least 1%, more preferably at least 2%, still more preferably at least 5%. and particularly at least 20%. To provide more specific values, for example for polyaryletherketone polymer and polyaryletherketone copolymers, the Young's modulus is preferably at least 3000 MPa, more preferably at least 3500 MPa and particularly at least 4000 MPa, tensile strength is preferably at least 50 MPa, more preferably at least 70 MPa and particularly at least 90 MPa and elongation at break is preferably at least 1.5%, more preferably at least 2%, still more preferably at least 3%. and particularly at least 5%, and for polyamide polymer and polyamide copolymers, Young's modulus is preferably at least 1000 MPa, more preferably at least 1500 MPa, still more preferably at least 2500 MPa, tensile strength is preferably at least 35 MPa, more preferably at least 45 MPa and particularly at least 70 MPa and elongation at break is preferably at least 5%, more preferably at least 20%, still more preferably at least 40% and particularly at least 60%.

(37) The process according to (35) or (36), wherein the final crystallinity of the manufactured object is 80% or less, preferably 50% or less, especially 5-70%, more preferably 15-50% and particularly 15-35%.

(38) The process according to any one of (35) to (37), wherein the cooling step cools the object from a temperature which is 1-50° C., more preferably 1-30° C. and most preferably 1-10° C. lower than $T_m$ of the polymer or copolymer comprised by the powder down to $T_g$ of the polymer or copolymer comprised by the powder at a cooling rate of 0.01-10° C./min, preferably 0.1-5° C./min, more preferably 1-5° C./min, after completion of the object, wherein $T_m$ is the melting temperature and $T_g$ is the glass transition temperature of the polymer or copolymer comprised by the powder, respectively.

(39) The process according to any one of (35) to (38), whereby the polymer or copolymer is as defined in (7) to (33).

(40) A three-dimensional object obtained by a selective sintering of a polymer, a copolymer or a blend of polymers in powder form by means of electromagnetic radiation, wherein the final crystallinity is in such a range that the balance of the overall mechanical properties of Young's modulus, tensile strength and elongation at break is improved. The Young's modulus of the polymer or copolymer is preferably at least 500 MPa, more preferably at least 1000 MPa and particularly at least 2000 MPa, tensile strength is preferably at least 20 MPa, more preferably at least 30 MPa and particularly at least 40 MPa, and elongation at break is preferably at least 1%, more preferably at least 2%, still more preferably at least 5%. and particularly at least 20%. To provide more specific values, for example for polyaryletherketone polymer and polyaryletherketone copolymers, the Young's modulus is preferably at least 3000 MPa, more preferably at least 3500 MPa and particularly at least 4000 MPa, tensile strength is preferably at least 50 MPa, more preferably at least 70 MPa and particularly at least 90 MPa and elongation at break is preferably at least 1.5%, more preferably at least 2%, still more preferably at least 3%. and particularly at least 5%, and for polyamide polymer and polyamide copolymers, Young's modulus is preferably at least 1000 MPa, more preferably at least 1500 MPa, still more preferably at least 2500 MPa, tensile strength is preferably at least 35 MPa, more preferably at least 45 MPa and particularly at least 70 MPa and elongation at break is preferably at least 5%, more preferably at least 20%, still more preferably at least 40% and particularly at least 60%. A three-dimensional object, alone or in combination with (40), obtained by a selective sintering of a polymer, a copolymer or a blend of polymers in powder form by means of electromagnetic radiation, wherein the final crystallinity is 80% or less, preferably 50% or less, especially 5-70%, more preferably 15-50% and particularly 15-35%.

(41) The three-dimensional object according to (40) to (41), whereby the polymer or copolymer is as defined in (7) to (33).

(42) An apparatus for manufacturing a three-dimensional object from a powder by selective sintering by means of electromagnetic radiation of the powder, comprising a temperature control device for a predefined cooling of the object after completion of manufacturing the object.

(43) The apparatus according to (42), wherein the temperature control device is set depending on the powder material.

(44) The apparatus according to (43) or (44), wherein the temperature control device is set depending on a type of polymer, copolymer or polymer blend comprised by the powder material.

(45) A use of a polymer powder in the manufacture of a three-dimensional object by means of selective electromagnetic irradiation sintering, wherein the polymer is preselected for lowering the final crystallinity of the manufactured object.

(46) The use according to (46), wherein the crystallinity is lowered such that the balance of the overall mechanical properties of Young's modulus, tensile strength and elongation at break is improved. The Young's modulus of the polymer or copolymer is preferably at least 500 MPa, more preferably at least 1000 MPa and particularly at least 2000 MPa, tensile strength is preferably at least 20 MPa, more preferably at least 30 MPa and particularly at least 40 MPa and elongation at break is preferably at least 1%, more preferably at least 2%, still more preferably at least 5%. and particularly at least 20%.

To provide more specific values, for example for polyaryletherketone polymer and polyaryletherketone copolymers, the Young's modulus is preferably at least 3000 MPa, more preferably at least 3500 MPa and particularly at least 4000 MPa, tensile strength is preferably at least 50 MPa, more preferably at least 70 MPa and particularly at least 90 MPa and elongation at break is preferably at least 1.5%, more preferably at least 2%, still more preferably at least 3%. and particularly at least 5%, and for polyamide polymer and polyamide copolymers, Young's modulus is preferably at least 1000 MPa, more preferably at least 1500 MPa, still more preferably at least 2500 MPa, tensile strength is preferably at least 35 MPa, more preferably at least 45 MPa and particularly at least 70 MPa and elongation at break is preferably at least 5%, more preferably at least 20%, still more preferably at least 40% and particularly at least 60%.

(47) The use according to (46) or (47), wherein the crystallinity is lowered such that the final crystallinity is 80% or less, preferably 50% or less, especially 5-70%, more preferably 15-50% and particularly 15-35%.

(48) The use according to any one of (46) to (48), whereby the preselected polymer is as defined in (7) to (33).

(49) The use according to any one of (45) to (48), wherein the polymer is further preselected for lowering the porosity of the manufactured three-dimensional object.

BRIEF DESCRIPTION OF THE DRAWINGS

FIG. 1 shows a laser sintering device for a layer-wise manufacturing of a three-dimensional object.

DETAILED DESCRIPTION OF THE INVENTION

In order to improve a process for manufacturing a three-dimensional object from a powder by selective sintering by means of electromagnetic radiation of the powder comprising at least one polymer or copolymer, extensive test series were carried out by the inventors to find critical factors that are particularly suited to manufacture three-dimensional objects having improved mechanical properties.

Thereby it was found that certain mechanical properties of the three-dimensional object manufactured by selective sintering of polymer powder materials are significantly improved when limiting the crystallinity of the manufactured object, and in particular when adjusting the obtained crystallinity within a specific range. Surprisingly, this resulted in a marked improvement of certain, very advantageous mechanical properties including, but not limited to high stiffness, high compression strength, high impact strength, high maximal tensile- and bending strength as well as high elongation at break and high heat deflection temperature, while on the other hand trade-off properties such as good chemical resistance and low post shrinkage by post crystallisation are well balanced. Furthermore, a decrease of the porosity of the manufactured object became feasible, which additionally contributes to the improvement of the mechanical properties of the manufactured object.

Objects manufactured by selective sintering by means of electromagnetic radiation of a powder comprising at least one polymer, typically have crystallinity values substantially higher than objects manufactured by classical polymer processing technologies like e.g. injection molding. That is, in a process for manufacturing a three-dimensional object from a powder by selective sintering by means of electromagnetic radiation of the powder comprising at least one polymer, for example of a type as it is illustrated in FIG. 1, crystallinity values in the manufactured object tend to become predominant without the crystallinity adjustment according to the present invention. Specifically, in the layer-wise building process, a high powder bed temperature lying at about 1-50° C., preferably 1-30° C., even more preferably 1-20° C. and most preferably 1-10° C. below the melting point $T_m$ of the polymer is generally used. The object is typically exposed to relatively high processing temperatures for a substantial period of time and still passes a usually very long cooling period. To prevent or minimize curling of the part during the building process, the processing temperature should be kept close to the melting point of the polymer powder in order to provide for a good connection between successive layers and minimizes the formation of pores due to an inadequately melting of the powder particles. Consequently, the temperature of the powder bed is kept during the whole building process above the crystallization temperature $T_c$ of the polymer. The generated object itself may be exposed for a long time to temperatures above $T_c$. At the end of the building process, when all heating sources of the sintering machine are switched off, the cooling through $T_c$ of the object starts due to natural heat loss to the environment. Because of the low heat conductivity of the polymer powder and the large powder bed, this may take hours to days, —depending on the polymer powder used and the processing conditions, i.e. without predefining a proper cooling rate—which would further amplify crystallization of the polymer object, eventually during the cooling process. Without proper control, even post-crystallization of the laser sintered polymer object may occur. As a consequence, relatively high and partly extremely high crystallinities are obtained in the manufactured object without properly observing crystallinity characteristics according to the present invention. In turn, without properly limiting crystallinity, relevant mechanical properties of the object may be worsened.

On the other hand, in the selective sintering process according to the present invention, the crystallinity in the manufactured object may be beneficially adjusted still high enough to also provide for positive influences on high chemical resistance, low post shrinkage at temperatures above Tg or high stiffness of the manufactured object. Thus, an excellent balance of properties can be achieved by the present invention.

When the crystallinity of the object manufactured from polymer powder materials is properly limited and preferably adjusted within a particular range, a marked improvement of certain, very advantageous mechanical properties like tensile strength, Young's modulus and elongation at break can be attained. 1) Preselecting an appropriate type of polymer material, 2) tailoring of the structural characteristics and/or modifications of the polymer comprised in the preselected powder, and/or 3) paying attention to a predefined and/or controlled cooling step after completion of the sintering process of the object are particularly effective and preferred means to limit and adjust the crystallinity values of the manufactured object.

Thus, according to a preferred embodiment of the present invention, a predefined and/or controlled cooling step after completion of the object after the sintering is preferably applied to the object. The predefined and/or controlled cooling step may be realized by predefined slow cooling, possibly slower than native (passive) cooling, or by active cooling in order to provide fast cooling. As the conditions of the predefined and/or controlled cooling step mainly depend on the type and specification of the polymer, copolymer or polymer blend used, useful settings for said cooling step can be experimentally tested with the proviso that the final crystallinity is preferably 80% or less, preferably 50% or less, especially 5-70%, more preferably 15-50% and particularly 15-35%.

As for example. illustrated when using PAEK materials as representative examples and seeking to prevent curling, PEEK (polyetheretherketone) rather need a well defined low cooling rate after the sintering/building process of the object, while other PAEK materials like PEK (polyetherketone) are preferably cooled down with a fast cooling rate after the sintering/building process. Preferred cooling rates for PAEKs after the sintering/building process are: When the manufactured object is cooled from the processing temperature which is preferably at a temperature being 1-10° C. lower than the melting point of the powder, to Tg of the used PAEK, the cooling rate is preferably 0.01-10° C./min and more preferably between 0.1-5° C./min and most preferably between 1-5° C./min, in order to minimize and ensure low post-crystallization and low curling of the parts. For example, preselecting PEK powder and appropriately applying a cooling rate of e.g. 0.3° C./min, a low crystallinity of e.g. 36% is attained, which provides improved mechanical properties like a tensile strength of 79 MPa (see Example 5). Further limiting crystallinity down to 31%, for example by applying a faster cooling rate of e.g. more than 0.3° C./min provides a surprisingly further improved tensile strength of 88 MPa (Example 6).

However, the cooling rate after completion of the object may also affect the curling and thus the dimensional stability of the object. It has been surprisingly found that the cooling rate can be predefined such that the three-dimensional object has not only a specific range of crystallinity and thereby provides the above mentioned advantageous mechanical properties, but also a high dimensional stability, that is, it does not curl.

As for example illustratively demonstrated by using PAEK polymers, it was found that a PEEK powder, rather needs a relatively slow cooling rate, e.g. about 0.1-0.3° C./min, compared to a PEK powder in order to attain both low crystallinity and high dimensional stability (avoiding curling) (cf. Examples 2 and 3). At a higher cooling rate, this material would tend to curling phenomena.

In the following, some significant structural characteristics or modifications of a polymer or copolymer material, which are appropriate for a preselection to be subjected to a selective sintering process by electromagnetic radiation, are exemplarily described for PAEK polymers and copolymers. It will become apparent for the person skilled in the art that the below described structural characteristics or modifications likewise apply to other kinds of polymers.

Particularly suitable alternative polymer materials other than PEAK polymers and copolymers include, but are not limited to polyamides, polyesters, polyethers, polyolefins, polystyrenes, polyphenylensulfides, polyvinylidenfluorides, polyphenylenoxides, polyimides, and copolymers thereof. Suitable polyamide polymers or copolymers may be selected from the group consisting of polyamide 6, polyamide 66, polyamide 11, polyamide 12, polyamide 612, polyamide 610, polyamide 1010, polyamide 1212 and copolymers comprising at least one of the aforementioned polymers, and polyamide elastomers such as polyether block amide, e.g. PEBAX®-based materials. Suitable polyester polymers or copolymers may be selected from the group consisting of polyalkylentherephthalates (e.g. PET, PBT) and their copolymers with 1,4-cyclohexanedimethylol. Suitable polyolefin polymers or copolymers may be selected from the group consisting of polyethylene and polypropylene. Suitable polystyrene polymers or copolymers may be selected from the group consisting of syndiotactic- and isotactic polystyrene.

Assuming a given molecular weight of a selected polymer such as PAEK as a reference, it was found by the inventors that already a relatively slight increase in molecular weight of the polymer comprised in the powder readily leads to a surprisingly marked decrease of the crystallinity in the manufactured object, which in turn transforms into a significant improvement of certain, very advantageous mechanical properties of the manufactured object. For example, preselecting a PEEK polymer material having a relatively higher molecular weight of typically Mn=32,000 and Mw=99,000 rather than having a molecular weight of typically Mn=23,000 and Mw=68,000 assists in lowering crystallinity of the manufactured object to below 50% (see, e.g. Examples 1 and 2 showing a lowering from 52% to 45%). While an increase in molecular weight might lower the density and thus increase porosity, it substantially contributes to increasing the tensile strength and elongation at break (see, e.g. Examples 1 and 2 showing a considerable increase in tensile strength from 44 MPa to 71 MPa and an increase in elongation at break from ~1% to ~2%). However, above a specific molecular weight, a saturation effect occurs. No considerable decrease of crystallinity and increase of mechanical properties is possible anymore (cf. Example 3). Therefore, the molecular weight $M_n$ is preferably adjusted to at least 9,000, preferably 10,000 to 100,000, more preferably 15,000 to 50,000 and most preferably 20,000 to 35,000 or Mw is preferably adjusted to 20,000 to 500,000, preferably 40,000 to 200,000 and more preferably 50,000 to 125,000.

Analogous explanations as stated above for the molecular weight also apply for the melt viscosity of the polymer or copolymer. The melt viscosity correlates with the molecular weight of the polymer or copolymer as follows: the higher the molecular weight of a polymer or copolymer, the higher is also its melt viscosity. Therefore, for PAEK polymers or copolymers, melt viscosities in a range of 0.05-1.0 kN*s/m$^2$, more preferably 0.15-0.6 kN*s/m$^2$ and particularly 0.2-0.45 kN*s/m$^2$ are preferred.

The formula shown below shows a general structure for PAEK or PAES polymers and copolymers that are preferred to built up laser sintered objects, wherein structural peculiarities will be further described below to obtain desirably low crystallinities:

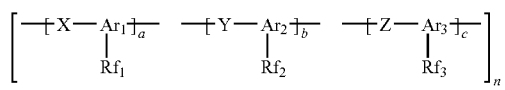

$Ar_1$, $Ar_2$ and $Ar_3$ independently from each other denote unsubstituted or substituted, monocyclic or polycyclic aromatic hydrocarbons, wherein optional substituents may be selected from:

$Rf_1$, $Rf_2$, $Rf_3$=denote independently from each other C1 to C6 straight chain or branched chain or cyclic alkyl and alkoxy groups, and aryl groups, preferably Me, i-Pr, t-Bu, Ph, wherein each $Ar_1$, $Ar_2$ and $Ar_3$ may have one or more $Rf_1$, $Rf_2$, $Rf_3$ substituent(s) respectively X=O and/or S Y=CO and/or $SO_2$ Z=$SO_2$, CO, O and/or S a is a low integer which is more than 0, preferably lower than 12, more preferably 1 to 6 and particularly 1 to 3 b is a low integer which is more than 0, preferably lower than 12, more preferably 1 to 6 and particularly 1 to 3 c is 0 or a low integer, preferably lower than 12, more preferably 1 to 6 and particularly 1 to 3 n denotes the degree of polymerisation

In the above general formula, the indices a, b and c denote the number of the respective units in squared brackets in the repeating unit of the polymer or the repeating units of the copolymer respectively, wherein one or more unit(s) of the same kind, e.g. the unit indexed with a, may be located between units of a different kind, e.g. the unit indexed with b and/or c. The location of the respective units within the repeating unit may be derived from the abbreviation of the PAEK derivative.

For example, for PEK, the repeating unit comprises $Ar_1$ being unsubstituted phenylene, X being O and a=1, $Ar_2$ being unsubstituted phenylene, Y being CO and b=1 and c=0. Thus, PEK has a structure of the following formula

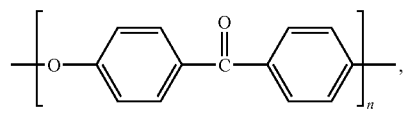

wherein n denotes the degree of polymerisation. As another example, for PEEK, the repeating unit comprises $Ar_1$ being unsubstituted phenylene, X being O and a=2, $Ar_2$ being unsubstituted phenylene, Y being CO and b=1 and c=0. Concerning the location of the respective ester and ketone units, the abbreviation PEEK indicates that two ester (E) units are followed by one ketone (K) unit, thus PEEK has a structure of the following formula

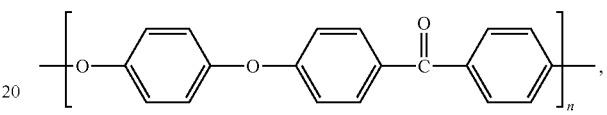

wherein n denotes the degree of polymerisation. As a further example, for PEKEKK, the repeating unit comprises $Ar_1$ being unsubstituted phenylene, X being O and a=2, $Ar_2$ being unsubstituted phenylene, Y being CO and b=3 and c=0. Concerning the location of the respective ester and ketone units, the abbreviation PEKEKK indicates that one ester (E) unit is followed by one ketone (K) unit, then one ether unit follows which is followed by 2 ketone units, thus PEKEKK has a structure of the following formula

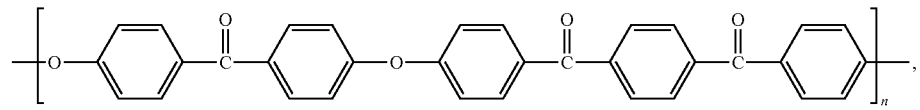

wherein n denotes the degree of polymerisation.

For PAEK polymers and copolymers, the degree of polymerisation n is preferably 10 to 1.000, more preferably 20 to 500 and particularly 40 to 250.

The larger the required space of the aromatic hydrocarbon group $Ar_1$, $Ar_2$ and $Ar_3$, the more the aromatic hydrocarbon group behaves like a rigid rod segment and the lower is the final crystallinity of the manufactured object. Hence, it is preferred that the aromatic hydrocarbon groups $Ar_1$, $Ar_2$ and $Ar_3$ are respectively and independently selected from the group consisting of 1,4-phenylene, 4,4'-biphenylene, 4,4'-isopropylidendiphenylene, 4,4'-diphenylsulfone, 1,4-, 1,5- and 2,6-naphthalene, 4,41-terphenylene and alpha-di(4-phenylene)phthalide.

Side chains $Rf_1$, $Rf_2$, $Rf_3$ at the aromatic hydrocarbons in the backbone chain affect the mobility of the polymer chains in the melt and thus preferably allow to beneficially influence, hence lower the final crystallinity of the manufactured object.

Moreover, the ratio between the amount of keto groups Y and the amount of ether- or thioether groups X is preferably 1:4 to 4:1. Within this ratio range, the crystallinity can be considerably lowered. For example, when comparing the use of PEK (ratio 1:1) and PEEK (ratio 2:1) having similar typical molecular weights (cf. examples 1 and 4), PEK is preferred over PEEK in terms of achieving lower crystallinity. On the other hand, a similarly controlled crystallinity can be achieved also when using PEEK by making use of other compensation control, e.g. by using PEEK of correspondingly higher molecular weight, or by appropriately predefining cooling after sintering at a high cooling rate.

A further possibility for tailoring the polymer to achieve the desirably limited final crystallinity of the manufactured object after the selective sintering process is to use an appropriate copolymer. For PAEKs, a copolymer with polyarylethersulfone (PAES) is preferable, in particular a polyaryletherketone(PAEK)/polyarylethersulfone(PAES)-diblock-copolymer or PAEK/PAES/PAEK-triblock-copolymer, more particular a polyetherketone(PEK)/polyethersulfone(PES)-diblock-copolymer or PEK/PES/PEK-triblock-copolymer. It was found that the higher the amount of the polyarylethersulfone-component, the lower the crystallinity of the manufactured object. Thus, in particular, the ratio of the amount of sulfone groups Z to the amount of keto groups Y is preferably between 50:50 and 10:90. Within this ratio range, a glass transition temperature ($T_g$) and a melting point ($T_m$) of the polymer material can be adjusted which are suitable for processing the polymer in an apparatus for manufacturing a three-dimensional object by a selective sintering by means of electromagnetic radiation. In order to provide suitable processing temperatures for the selective sintering process, said PEK/PES-copolymers preferably have a $T_g$ higher than 180° C. and a melting temperature $T_m$ of 300 to 430° C.

It was further found that the end groups of the backbone chain of the polymer or copolymer may act as a crystallisation seed during the crystallisation. Therefore, the end groups of the polymer or copolymer may be derivatised in order to interfere with crystallisation, and thus to limit the crystallinity of the manufactured object.

The end groups may also be chosen such that they lead to an elongation of the polymer- or copolymer chain by a chemical reaction, preferably at temperatures above $T_m$ of the polymer, between the end group, e.g. by polycondensation, electrophilic or nucleophilic aromatic substitution, coupling reactions or the like. This results in a decrease of the crystallinity of the manufactured object due to an increased molecular mass The end groups of the backbone chain of the polymer or copolymer depend on the kinds of monomers used for synthesis and on the kind of polymerisation. In the following, two different kinds of PAEK synthesis schemes resulting in different kinds of PAEKs with different end groups are shown.

PAEKs can be normally synthesized in two ways, namely by electrophilic aromatic substitution (Friedel-Crafts-Acylation) or nucleophilic aromatic substitution. For example, in the nucleophilic synthesis of a PAEK, a 1,4-bishydroxy-benzene is polymerized with an 4,4' dihalogenated benzophenone component:

xHO-Ph-OH+(y+1)Hal-Ph-CO-Ph-Hal→Hal-Ph-CO-Ph-[O-Ph-O]$_x$[Ph-CO-Ph]$_y$-Hal, wherein Hal is F, Cl, Br and x and y denote the number of monomers incorporated in the polymer.

As a result, the PAEK backbone chain, in the above example PEEK may be terminated with a residual halogen group after the polymerization, most suitably with fluorine, optionally alternatively with chlorine or bromine, at none or one end (not shown) or at both ends (shown) of the backbone chain. The same applies for the synthesis of PAEK or polyethersulfone (PAES) copolymers, wherein the dihalogenated ketone unit may be substituted partly by a dihalogenated aromatic sulfone. The aromatic bishydroxy-component may likewise be partly or fully substituted by a bisthiol component.

For example, the halogen substituted ends of the polymer may be derivatized by a termination reaction with phenol:

2Ph-OH+Hal-Ph-CO-Ph-[O-Ph-O]$_x$[Ph-CO-Ph]$_y$-Hal→Ph-O-Ph-CO-Ph-[O-Ph-O]$_x$[Ph-CO-Ph]$_y$—O-Ph

Preferably, Hal in the formulae above is F.

In the case of synthesis of PAEK polymers or copolymers by electrophilic aromatic substitution reaction, diacylaromates, e.g. aromatic diacids or preferably aromatic diacid chlorides or aromatic diacid anhydrides, are polymerized with a bisaromatic ether or thioether component. For example, for PEKK, this may result in PEKK polymers or copolymers with phenyl groups at none or one end (not shown) or both ends (shown) of the backbone chain:

xR$_A$OC-Ph-COR$_A$+(y+1)Ph-O-Ph→Ph-O-Ph-[OC-Ph-CO]$_x$[Ph-O-Ph]$_y$—H, wherein R$_A$ is Cl or —OH and x and y denote the number of monomers incorporated in the polymer.

Alternatively, a synthesis by a single monomer route using, for example, an aromatic mono-acid chloride may be applied.

For example, the phenyl groups at the ends of the polymer may be derivatized by a termination reaction with benzoic acid chloride:

2Ph-COCl+Ph-O-Ph-[OC-Ph-CO]$_x$[Ph-O-Ph]$_y$—H→Ph-CO-Ph-O-Ph-[OC-Ph-CO]$_x$[Ph-O-Ph]$_y$—OC-Ph

Irrespective if a nucleophilic or aromatic substitution reaction is chosen, to slow down crystallization of the polymer, the end groups may be preferably substituted, e.g. such that a PAEK polymer has the following formula:

R$_T$-U-[PAEK]-U-R$_T$, wherein U is a linking moiety, for example NH, O, CO, CO—O—, SO, a single bond, —(CH$_2$)$_k$ wherein k is 1-6, or the like; and the left hand and right hand structural moieties R$_T$ may be the same or different structural groups, usually the structural moieties R$_T$ are the same. Preferably, R$_T$ is selected from the group of unsubstituted or substituted aliphatic or aromatic hydrocarbon residues. U may be formed by direct reaction with the ends of the polymer or copolymer, for example a monofunctional hydroxy compound may form O as U, or it may be introduced as a substituent of the termination reagent, e.g. HO-Ph-COO-tert-butyl may form COO as U.

Furthermore, if it is necessary to increase the crystallization rate in order to adjust the crystallinity of the manufactured three-dimensional object appropriately, the polyaryletherketones with a halogenated end group can be terminated with ionic end groups like e.g. phenate salts like NaOPhSO$_3$Na or NaOPhCOPhOPhSO$_3$Na. Subsequent acidification of the phenate salts with e.g. HCl leads to —SO$_3$H end groups that show a slightly reduced nucleation effect.

The polymer or copolymer may be blended with an alloying component in a blend, wherein a blend of at least two different polymers or copolymers is used. It is preferred that in such a blend, at least one component of the blend reduces the final crystallinity of the manufactured object.

Similar structural characteristics or modifications explained for PAEK can likewise be applied to alternative polymer or copolymer materials mentioned above.

Furthermore, the powder may be a composite powder which comprises one or more filler(s) and/or additive(s) besides a matrix of the respective polymer, copolymer or blend. Fillers may be used to further improve the mechanical properties of the manufactured object. For example, fillers such as fibers, including but not limited to carbon fibers, glass fibers, Kevlar fibers, carbon nano fibers, or fillers having a low aspect ratio (glass beads, aluminum grit, etc.) or mineral fillers such as titane dioxide may be incorporated in the powder comprising at least one polymer or copolymer. Furthermore, process additives which improve the proccessability of the powder, e.g. free flowing agents such as the ones from the Aerosil series (e.g. Aerosil R974, Aerosil 200), or other functional additives, like heat stabilizers, oxidation stabilizers, color pigments (carbon black, graphite, etc.)) may be used.

From the findings of the present invention it can be inferred generally that the following structural characteristics or modifications of polymers or copolymers favour limited crystallinity characteristics and thus are particularly preferred when a preselection of specific type of polymer or copolymer is made, e.g. among polyamide (PA), polyaryletherketone (PAEK), polyester, polyether, polyolefin, polystyrene, polyphenylensulfide, polyvinylidenfluoride, polyphenylenoxide, polyimide and copolymers thereof:

(i) selecting relatively high $M_n$ or $M_w$ or melt viscosities,
(ii) using long chain lengths or high polymerization degrees n
(iii) introducing aromatic groups in the backbone chain, which independently from each other denote unsubstituted or substituted, monocyclic or polycyclic aromatic hydrocarbons; preferably, the aromatic groups are respectively and independently selected from the group consisting of 1,4-phenylene, 4,4'-biphenylene, 4,4'-isopropylidendiphenylene, 4,4'-diphenylsulfone, 1,4-, 1,5- and 2,6-naphthalene, 4,4'-terphenylene and alpha-di(4-phenylene)phthalide,
(iv) substitution of the aromatic groups with one or more side chains, wherein the side chains are respectively and independently selected from the group of C1 to C6 straight chain or branched chain or cyclic alkyl and alkoxy groups, and aryl groups, preferably the side chains are respectively and independently selected from methyl, isopropyl, t-butyl or phenyl,
(v) modification of the end groups of the backbone chain of the polymer or copolymer, preferably by aliphatic or aromatic end groups, and
(vi) blending or alloying by blending at least two different polymers or copolymers.

EXAMPLES

The crystallinity of the manufactured object can be determined by various methods that are well known to the person skilled in the art. The crystallinity can be determined based on Differential Scanning calorimetry (DSC) according to DIN 53765 which is used as a reference method according to the present invention. With the value of a theoretically 100% crystalline polymer which can be found in scientific publications, e.g. 130 J/g for PEEK and 160 J/g for PEK (P C Dawson and D J Blundell, Polymer 1980, 21, 577-578) it is possible to calculate the final crystallinity by the following formula:

$$Xc = \frac{\text{Melt enthalpy determined by } DSC \text{ [J/g]}}{\text{melt enthalpy 100\% crystalline polymer [J/g]}} \times 100\%$$

In case of objects manufactured from composite powders, i.e. a powder comprising one or more filler(s) or additive(s) besides of a polymer, a copolymer or a blend of polymers, the crystallinity value relates to the polymer matrix of the composite which can also be calculated as defined above.

The crystallinity can also be determined by Wide Angle X-ray Scattering (WAXS) measurement. The procedure is well known by the person skilled in the art.

As a reference method for the present invention, crystallinity was determined in the following Examples based on DSC measurements performed on a Mettler-Toledo DSC 823 according to DIN 53765. The DSC sample was prepared from the middle of an ASTM D638 tensile bar that was built in x,y direction at least 5 cm from the edge of the exchangable frame on the laser sinter machine. Crystallinity was then determined by using the above shown formula.

The density was measured according to ISO 1183 on a Kern 770-60 balance with a Satorius Density Determination Set YDK 01.

Porosity is then calculated by the following formula:

$$\text{Porosity [\%]} = \frac{\text{Density of } PAEK \text{ part}}{\left(\left(\frac{(d_{100\%} - d_{0\%})}{100 \times X_c} + d_{0\%}\right) \times 100\right) - 100}$$

$d_{100\%}$=theoretical density of 100% crystalline PAEK
$d_{0\%}$=theoretical density of amorphous PAEK
$X_c$=crystallinity of PAEK part The density values for theoretically 100% crystalline PEEK ($d_{100\%}$=1.40 g/cm$^3$) and PEK ($d_{100\%}$=1.43 g/cm$^3$), as well as amorphous PEEK ($d_{0\%}$=1.265 g/cm$^3$) and PEK ($d_{0\%}$=1.272 g/cm$^3$) are well known in literature (P C Dawson and D J Blundell, Polymer 1980, 21, 577-578)

If the theoretical density values for the polymer is not known, the porosity can also be determined by micro-computerthomographie. A useful device is e.g. the µ-CT40 supplied by SCANCO Medical AG, Brüttisellen, Switzerland. The procedure is well known by the person skilled in the art.

In the Examples, melt viscosity are determined according to US-Patent 2006/0251878 A1 in a capillary viscosimeter with a wolfram-carbide nozzle at 400° C. and a shear rate of 1000 s$^{-1}$.

The following examples are merely illustrative of the present invention and they should not be considered as limiting the scope of the invention in any way. The examples and modifications or other equivalents thereof will become apparent to those versed in the art in the light of the present entire disclosure.

Example 1

Not According to the Invention

A powder made of PEEK (supplied by Victrex Plc, Thornton Cleveleys, Lancashire FY5 4QD, Great Britain) with a mean particle size distribution of 48 µm, wherein the PEEK polymer has a molecular mass of Mn=23,000 and Mw=65,000 and a melt viscosity of 0.15 kN*s/m$^2$, is thermally treated above glass transition temperature in an oven.

The PEEK powder with a bulk density of 0.45 g/cm$^3$ was processed on a laser sintering machine of the type P700, that was modified by EOS for high temperature applications. The temperature of the process chamber was 335° C.

After the laser sinter process was finished, the cooling rate was controlled by post-heating between 335° C. and Tg of PEEK (145° C.). The cooling rate showed a maximum average of 0.3° C./min The parts showed the following properties:
density=1.316 g/cm³
porosity (calculated by density/crystallinity)=1.4%
crystallinity (by DSC)=52%
Tensile test (ASTM D638, Type I):
  Young's modulus=4500 MPa
  Tensile strength=44 MPa
  Elongation at break=1.04%

Example 2

According to the Invention

A powder made of PEEK (supplied by Victrex Plc, Thornton Cleveleys, Lancashire FY5 4QD, Great Britain) with a mean particle size distribution of 48 µm, wherein the PEEK polymer has a molecular mass of Mn=32,000 and Mw=65,000 and a melt viscosity of 0.45 kN*s/m², is thermally treated above glass transition temperature in an oven.

The PEEK powder with a bulk density of 0.40 g/cm3 was processed on a laser sintering machine of the type P700, that was modified by EOS for high temperature applications. The temperature of the process chamber was 335° C.

After the laser sinter process was finished, the cooling rate was controlled by post-heating between 335° C. and Tg of PEEK (145° C.). The cooling rate showed a maximum average of 0.3° C./min The parts showed the following properties:
density=1.303 g/cm³
porosity (calculated by density/crystallinity)=1.6%
crystallinity=45%
Tensile test (ASTM D638, Type I):
  Young's modulus=4200 MPa
  Tensile strength=71 MPa
  Elongation at break=1.9%

Example 3

According to the Invention

A powder made of PEEK (supplied by Victrex Plc, Thornton Cleveleys, Lancashire FY5 4QD, Great Britain) with a mean particle size distribution of 48 µm, wherein the PEEK polymer has a melt viscosity of 0.54 kN*s/m², is thermally treated above glass transition temperature in an oven.

The PEEK powder was processed on a laser sintering machine of the type P700, that was modified by EOS for high temperature applications. The temperature of the process chamber was 335° C.

After the laser sinter process was finished, the cooling rate was controlled by post-heating between 335° C. and Tg of PEEK (145° C.). The cooling rate showed a maximum average of 0.3° C./min The parts showed the following properties:
density=1.300 g/cm³
crystallinity=42%
porosity (calculated by density/crystallinity)=1.6%
Tensile test (ASTM D638, Type I):
  Young's modulus=3800 MPa
  Tensile strength=74 MPa
  Elongation at break=2.2%

Example 4

According to the Invention

A powder made of PEK (supplied by Victrex Plc, Thornton Cleveleys, Lancashire FY5 4QD, Great Britain) with a mean particle size distribution of 48 µm, wherein the PEK polymer has a molecular mass of Mn=23,000 and Mw=65,000 and a melt viscosity of 0.22 kN*s/m², is thermally treated above glass transition temperature in an oven.

The PEK powder was processed on a laser sintering machine of the type P700, that was modified by EOS for high temperature applications. The temperature of the process chamber was 365° C.

After the laser sinter process was finished, the cooling rate was controlled by post-heating between 365° C. and Tg of PEK (157° C.). The cooling rate showed a maximum average of 0.3° C./min The parts showed the following properties:
density=1.310 g/cm³
crystallinity=39%
porosity (calculated by density/crystallinity)=1.8%
Tensile test (ASTM D638, Type I):
  Young's modulus=4220 MPa
  Tensile strength=80 MPa
  Elongation at break=2.2%

Example 5

According to the Invention

A powder made of PEK (supplied by Victrex Plc, Thornton Cleveleys, Lancashire FY5 4QD, Great Britain) with a mean particle size distribution of 48 µm, wherein the PEK polymer has a melt viscosity of 0.45 kN*s/m², is thermally treated above glass transition temperature in an oven.

The PEK powder was processed on a laser sintering machine of the type P700, that was modified by EOS for high temperature applications. The temperature of the process chamber was 365° C.

After the laser sinter process was finished, the cooling rate was controlled by post-heating between 365° C. and Tg of PEK (157° C.). The cooling rate showed a maximum average of 0.3° C./min The parts showed the following properties:
density=1.277 g/cm³
crystallinity=36%
porosity (calculated by density/crystallinity)=3.9%
Tensile test (ASTM D638, Type I):
  Young's modulus=3820 MPa
  Tensile strength=79 MPa
  Elongation at break=2.5%

Example 6

According to the Invention

A powder made of PEK (supplied by Victrex Plc, Thornton Cleveleys, Lancashire FY5 4QD, Great Britain) with a mean particle size distribution of 48 µm, wherein the PEK polymer has a melt viscosity of 0.45 kN*s/m², is thermally treated above glass transition temperature in an oven.

The PEK powder was processed on a laser sintering machine of the type P700, that was modified by EOS for high temperature applications, as described in example 4.

After the laser sinter process was finished, all heatings of the laser sintermachine were turned off. The average of the cooling rate was >0.3° C./min The parts showed the following properties:
density=1.285 g/cm³
porosity (calculated by density/crystallinity)=2.8%
crystallinity=31%

Tensile test (ASTM D638, Type I):
  Young's modulus=3950 MPa
  Tensile strength=88 MPa
  Elongation at break=2.8

The invention claimed is:

1. A process for the manufacture of a three-dimensional object from a polymer in powder form by means of selective electromagnetic irradiation sintering, the process comprising the steps of:
  (i) selecting a powder comprising a polyaryletherketone (PAEK) polymer or copolymer having a melt viscosity in a range of 0.2 to 1.0 kN*s/m$^2$;
  (ii) subjecting the powder comprising the PAEK polymer or copolymer of step (i) to selective sintering by means of electromagnetic radiation to form the object; and
  (iii) after completion of the object, cooling said object from a temperature which is 1-50° C. lower than a melting temperature $T_m$ of the polymer or copolymer comprised in the powder to a glass transition temperature $T_g$ of the polymer or copolymer comprised in the powder at a cooling rate of 0.01-10° C./min.,
  wherein the final crystallinity of the manufactured three-dimensional object is within a range of 5 to 45%.

2. The process according to claim 1, wherein the selecting is made of a polymer selected from polyaryletherketone (PAEK)/polyarylethersulfon(PAES)-diblock-copolymers or PAEK/PAES/PAEK-triblock-copolymers.

3. The process according to claim 1, wherein the selecting is made of a polymer selected from polyetherketone(PEK)/polylethersulfon(PES)-diblock-copolymers or PEK/PES/PEK-triblock-copolymers.

4. The process according to claim 1, the process further comprising selecting the polymer for lowering the porosity of the manufactured three-dimensional object.

5. The process according to claim 1, wherein the manufactured three-dimensional object has a porosity of lower than 5%, preferably lower than 3%.

6. The process according to claim 1, wherein the powder has a melting point $T_m$ in a range of 280 to 450° C.

7. The process according to claim 6, wherein the manufactured three-dimensional object has a porosity of lower than 5%, preferably lower than 3%.

8. The process according to claim 1, wherein the powder has a melting point $T_m$ in a range of 100 to 450° C.

9. The process according to claim 1, wherein the powder has a melting point $T_m$ in a range of 150 to 400° C.

10. The process according to claim 1, wherein the powder has a melting point $T_m$ in a range of 250 to 400° C.

11. The three-dimensional object obtained by the process according to claim 5.

12. The three-dimensional object according to claim 11, wherein the porosity is lower than 5%.

13. The three-dimensional object according to claim 11, wherein the porosity is lower than 2%.

14. The three-dimensional object according to claim 11, wherein the density is at least 1.24 g/cm$^3$.

15. The three-dimensional object according to claim 11, wherein the density is at least 1.26 g/cm$^3$.

16. The three-dimensional object according to claim 11, wherein the density is at least 1.28 g/cm$^3$.

17. The three-dimensional object according to claim 11, wherein the density is greater than 1.30 g/cm$^3$.

18. The three-dimensional object obtained by the process of claim 4.

19. The three-dimensional object according to claim 18, wherein the porosity is lower than 10%.

20. The three-dimensional object according to claim 18, wherein the porosity is lower than 5%.

21. The three-dimensional object according to claim 18, wherein the porosity is lower than 3%.

* * * * *